Patented Aug. 29, 1944

2,357,249

UNITED STATES PATENT OFFICE 2,357,249

METHOD OF PREPARING SULPHANILYL ARYL GUANIDINES

George W. Anderson, Stamford, Conn., assignor to American Cyanamid Company, New York, N. Y., a corporation of Maine No Drawing. Application February 10, 1942, Serial No. 430,251

7 Claims. (Cl. 260—397.7)

This invention relates to a method for preparing sulphanilyl aryl guanidines. More particularly it relates to a method of preparing sulphanilyl aryl guanidines by a method which comprises reacting an aryl amine with an acyl sulphanilyl nitroguanidine and subsequent hydrolysis to convert the acyl group into an amino group.

The compounds prepared in accordance with the process of the present invention are those represented by the following general formula:

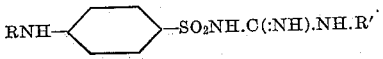

where R represents hydrogen or an acyl radical of a carboxylic acid and R' is an aryl radical. The above compounds are not claimed in the present invention since they are claimed in the co-pending application of Philip S. Winnek, Serial No. 430,243, filed February 10, 1942.

In the past it has been shown that sulphanilyl guanidine could be prepared by reacting guanidine with acetyl sulphanilyl chloride to give acetyl sulphanilyl guanidine which could subsequently be hydrolyzed to sulphanilyl guanidine. Attempts were made to prepare the corresponding aryl guanidine sulphanilyl compounds by substituting aryl guanidines for the guanidine itself in the prior reactions. It was found, however, that the reactions did not take place with the aryl guanidines.

In accordance with the present invention I have discovered that acyl sulphanilyl nitroguanidines will react with aryl amines to give acyl sulphanilyl aryl guanidines and that the acyl group may be hydrolyzed to give sulphanilyl aryl guanidines. Preferably an aryl amine such as aniline is made to react with acetyl sulphanilyl nitroguanidine by refluxing in a suitable solvent, such as for example, dioxane. The reaction product is then hydrolyzed to give the sulphanilyl aryl guanidine, in this case, sulphanilyl phenyl guanidine.

The invention will be described in greater detail in conjunction with the following specific examples, which, however, are merely illustrative of the preferred methods and are not intended to limit the scope of the invention. The parts are by weight except in the case of liquids which are expressed in corresponding parts by volume.

EXAMPLE 1

*Acetylsulphanilyl nitroguanidine*

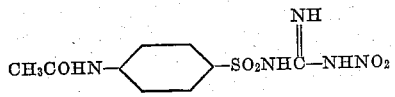

To a solution of 40 parts of sodium hydroxide in 100 parts of water are added 100 parts of acetone and 52 parts of nitroguanidine. Then a solution of 125 parts of acetylsulphanilyl chloride in 500 parts of acetone is slowly added with mechanical stirring and cooling so that the temperature does not rise above 13° C. During the addition 300 parts of water are added to prevent the formation of a solid cake. The final mixture is stirred for half an hour and then made acid with hydrochloric acid. Any solid which does not dissolve is filtered off, dissolved in acetone and recombined with the filtrate. On removal of the acetone by distillation, a precipitate of acetyl sulphanilyl nitroguanidine forms. The product is purified by dissolving in dilute ammonium hydroxide and reprecipitating with hydrochloric acid.

This same general procedure may be used for the preparation of other acylsulphanilyl nitroguanidines which may be utilized as starting materials in my process. These acyl derivatives may be derived from any organic carboxylic acid, such as for example, propionyl, butyryl, benzoyl, nicotnyl, and the like.

EXAMPLE 2

*Preparation of sulphanilyl phenyl guanidine*

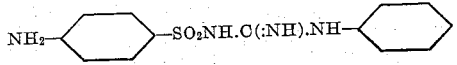

(A) Twenty-one parts of acetylsulphanilyl nitroguanidine are refluxed in 60 parts of dioxane with 13 parts of aniline for seven hours. The dark solution is cooled, diluted with 200 parts of water and made alkaline with ammonium hydroxide. The oily precipitate which first forms solidifies on chilling with ice water. This solid is filtered off and recrystallized from dilute alcohol.

(B) Seven parts of acetylsulphanilyl phenyl guanidine are refluxed with 13 parts by volume of hydrochloric acid and 26 parts of water. Refluxing is continued for five minutes after all of the solid dissolves. The solution is cooled and made alkaline with a sodium hydroxide solution. The precipitate which forms is filtered off and recrystallized from dilute alcohol, using decolorizing carbon.

EXAMPLE 3

*Preparation of sulphanilyl-p-tolyl guanidine*

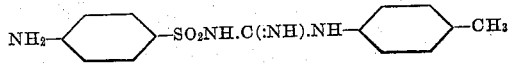

(A) Thirty parts of acetylsulphanilyl nitroguanidine and 21 parts of p-toluidine are refluxed in 100 parts of dioxane for ten hours. The clear solution is diluted with 350 parts of water, made alkaline with a few parts of ammonium hydroxide, and chilled. The solid which forms is filtered off and washed with alcohol.

(B) Fourteen parts of acetylsulphanilyl-p- tolyl guanidine (from A) are refluxed with 26 parts of concentrated hydrochloric acid and 52 parts of water. Twenty parts of ethyl alcohol are added to increase the solubility of the solid. After thirty minutes refluxing, the resulting solution is chilled, diluted with an equal volume of water and made alkaline with ammonium hydroxide. The sulphanilyl-p-tolyl guanidine which precipitates is filtered off and recrystallized from dilute alcohol.

EXAMPLE 4

*Preparation of sulphanilyl-o-tolyl guanidine*

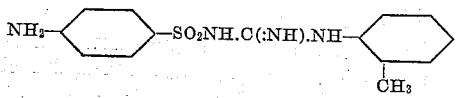

(A) Twenty-two parts of acetylsulphanilyl nitroguanidine and 15 parts of o-toluidine are refluxed in 75 parts of dioxane for ten hours. Then 300 parts of water and enough ammonium hydroxide to make alkaline are added. After chilling, the precipitate is filtered off and washed with alcohol to remove excess o-toluidine.

(B) The crude acetylsulphanilyl-o-tolyl guanidine obtained in A is hydrolyzed by refluxing with 20 parts of concentrated hydrochloric acid, 40 parts of water, and a few parts of ethyl alcohol for half an hour. The product is cooled and made alkaline with ammonium hydroxide. The precipitated sulphanilyl-o-tolyl guanidine is purified by recrystallization from dilute alcohol.

In the foregoing examples, dioxane was employed as the reaction medium. It should be understood, however, that the reactions may be carried out in any suitable organic liquid medium, such as for example, acetone, isopropyl alcohol, tertiary butyl alcohol, or the like. Similarly, the acetyl sulphanilyl nitroguanidine may be replaced by the corresponding acyl derivatives of any carboxylic acid. The acetyl compound is preferred because of its cheapness and availability. However, it is to be understood that other acyl compounds may be used including those such as propionyl, butyryl, benzoyl, nicotinyl, and the like. Similarly, instead of p-acetylaminobenzene sulphonyl chloride, the corresponding p-acetylaminobenzene sulphonyl bromide may be used.

The reactions, as specifically illustrated, employed the most readily available aryl amines. The invention, however, is not limited to reactions employing these specific aryl amines and any aryl amine may be employed in the process, for example, the various amino derivatives of benzene with other substituents on the ring, as well as amino naphthalenes, both substituted and unsubstituted.

What I claim is:

1. The process of producing sulphanilyl aryl substituted guanidines which comprises reacting a primary aromatic amine with an acyl sulphanilyl nitroguanidine to give an acyl sulphanilyl aryl substituted guanidine and hydrolyzing to give sulphanilyl aryl substituted guanidine.

2. The process which comprises reacting a primary aromatic amine with an acyl sulphanilyl nitroguanidine to give an acyl sulphanilyl aryl substituted guanidine.

3. The process of producing sulphanilyl aryl substituted guanidines which comprises reacting a primary aromatic substituted amine with acetylsulphanilyl nitroguanidine to give an acetylsulphanilyl aryl guanidine and removing the acetyl group by hydrolysis.

4. The process of producing sulphanilyl phenyl guanidine which comprises reacting aniline with acetylsulphanilyl nitroguanidine to give acetylsulphanilyl phenyl guanidine and removing the acetyl group by hydrolysis.

5. The process of producing sulphanilyl p-tolyl guanidine which comprises reacting p-toluidine with acetylsulphanilyl nitroguanidine to give acetylsulphanilyl p-tolyl guanidine and removing the acetyl group by hydrolysis.

6. The process of producing sulphanilyl o-tolyl guanidine which comprises reacting o-toluidine with acetylsulphanilyl nitroguanidine to give acetylsulphanilyl o-tolyl guanidine and removing the acetyl group by hydrolysis.

7. The process of preparing acetylsulphanilyl aryl substituted guanidines which comprises reacting a primary aromatic amine with acetylsulphanilyl nitroguanidine.

GEORGE W. ANDERSON.

CERTIFICATE OF CORRECTION.

Patent No. 2,357,249.  August 29, 1944.

GEORGE W. ANDERSON.

It is hereby certified that error appears in the printed specification of the above numbered patent requiring correction as follows: Page 2, second column, line 23, claim 3, before the word "amine" strike out "substituted" and insert the same before "guanidine" in line 25, same claim; and that the said Letters Patent should be read with this correction therein that the same may conform to the record of the case in the Patent Office.

Signed and sealed this 21st day of November, A. D. 1944.

Leslie Frazer (Seal)  Acting Commissioner of Patents.